(12) United States Patent
Batawi

(10) Patent No.: US 6,232,009 B1
(45) Date of Patent: May 15, 2001

(54) ELECTROCHEMICALLY ACTIVE ELEMENT FOR A HIGH TEMPERATURE FUEL CELL

(75) Inventor: Emad Batawi, Winterthur (CH)

(73) Assignee: Sulzer Hexis AG, Winterthur (CH)

( * ) Notice: Subject to any disclaimer, the term of this patent is extended or adjusted under 35 U.S.C. 154(b) by 0 days.

(21) Appl. No.: 09/136,443

(22) Filed: Aug. 19, 1998

(30) Foreign Application Priority Data

Sep. 11, 1997 (EP) ................................................. 97810647

(51) Int. Cl.$^7$ ....................................................... H01M 4/86
(52) U.S. Cl. ............................. 429/40; 429/41; 429/45; 429/46
(58) Field of Search ................... 429/40, 44, 45, 429/46, 30, 33, 41; 428/307.3, 319.1, 320.2

(56) References Cited

U.S. PATENT DOCUMENTS

| | | | |
|---|---|---|---|
| 3,522,103 | | 7/1970 | White ..................................... 136/120 |
| 5,500,307 | | 3/1996 | Anzai ....................................... 429/30 |
| 5,834,108 | * | 8/1999 | Shimai et al. ....................... 428/307.3 |
| 5,866,275 | * | 2/1999 | Kawasaki et al. ...................... 429/30 |
| 5,868,918 | * | 2/1999 | Adler et al. ............................ 205/615 |
| 5,939,219 | * | 8/1999 | Jansing et al. ........................... 429/32 |
| 5,942,348 | * | 8/1999 | Jansing et al. ........................... 429/32 |

FOREIGN PATENT DOCUMENTS

| | | | |
|---|---|---|---|
| 42 37 519 C1 | 3/1994 | (DE) | ............................... H01M/8/12 |
| 44 00 540 A1 | 7/1995 | (DE) | ............................... H01M/4/86 |
| 0 552 055 A2 | 7/1993 | (EP) | ................................ H01M/8/12 |
| 0 593 281 A2 | 4/1994 | (EP) | ................................ C04B/35/00 |

OTHER PUBLICATIONS

Eguchi, K., et al., "The Activation and Transfer of Oxygen at Electrolyte/Cathode Interface For SOFCs", in: *Proceedings of the International Symposium on Solid Oxide Fuel Cell*, Athens, Jul. 2–5, 1991, No. Symp. 2, Jul. 2, 1991, pp. 697–704.

Chen, C.C., et al., "Cathode/electrolyte interactions and their expected impact on SOFC performance", (Abstract) in: Chemical Abstracts, vol. 119, No. 10, Sep. 6, 1993, Abstract No. 99807.

Patent Abstracts of Japan, vol. 015, No. 062 (E–1033), Feb. 14, 1991 & JP 02 288159 A (NGK Insulators Ltd.), Nov. 28, 1990, Abstract.

Patent Abstracts of Japan, vol. 016, No. 238 (C–0946), Jun. 2, 1992 & JP 04 050155 A (Agency of Ind. Science & Technol; Others: 01) Feb. 19, 1992, Abstract.

Patent Abstracts of Japan, vol. 014, No. 550 (E–1009), Dec. 6, 1990 & JP 02 236959 A (Mitsubishi Heavy Ind. Ltd.,) Sep. 19, 1990, Abstract.

Patent Abstracts of Japan, vol. 013, No. 496 (E–843), Nov. 9, 1989 & JP 01 200560 A (Mitsubishi Heavy Ind. Ltd), Aug. 11, 1989, Abstract.

Patent Abstracts of Japan, vol. 012, No. 291 (E–644), Aug. 9, 1988 & JP 63 066859 A (Agency of Ind. Science & Technol; Others: 01) Mar. 25, 1988, Abstract.

* cited by examiner

Primary Examiner—Stephen Kalafut
Assistant Examiner—R Alejandro
(74) Attorney, Agent, or Firm—Townsend & Townsend & Crew LLP

(57) ABSTRACT

The electrochemically active element (1) for a high temperature fuel cell is designed in the form of layers and comprises an anode layer (3), a cathode layer (4) and an electrolyte layer (2) which is arranged therebetween. The electrolyte is a ceramic material of zirconium oxide $ZrO_2$ stabilised with yttrium Y which can additionally contain aluminium oxide $Al_2O_3$. The anode is manufactured from a power mixture through sintering on the electrolyte layer. This anode mixture contains the oxides NiO and CeO2 and can contain an oxide of the type $A_2O_3$, with for example A=Sm, Y, Gd and/or Pr. In accordance with the invention 0.5–5 $^{mol}/_o$ CoO, FeO and/or MnO is or are to be added to the anode mixture in order to lower the sintering temperature of this mixture.

13 Claims, 1 Drawing Sheet

ELECTROCHEMICALLY ACTIVE ELEMENT FOR A HIGH TEMPERATURE FUEL CELL

Figure 1:
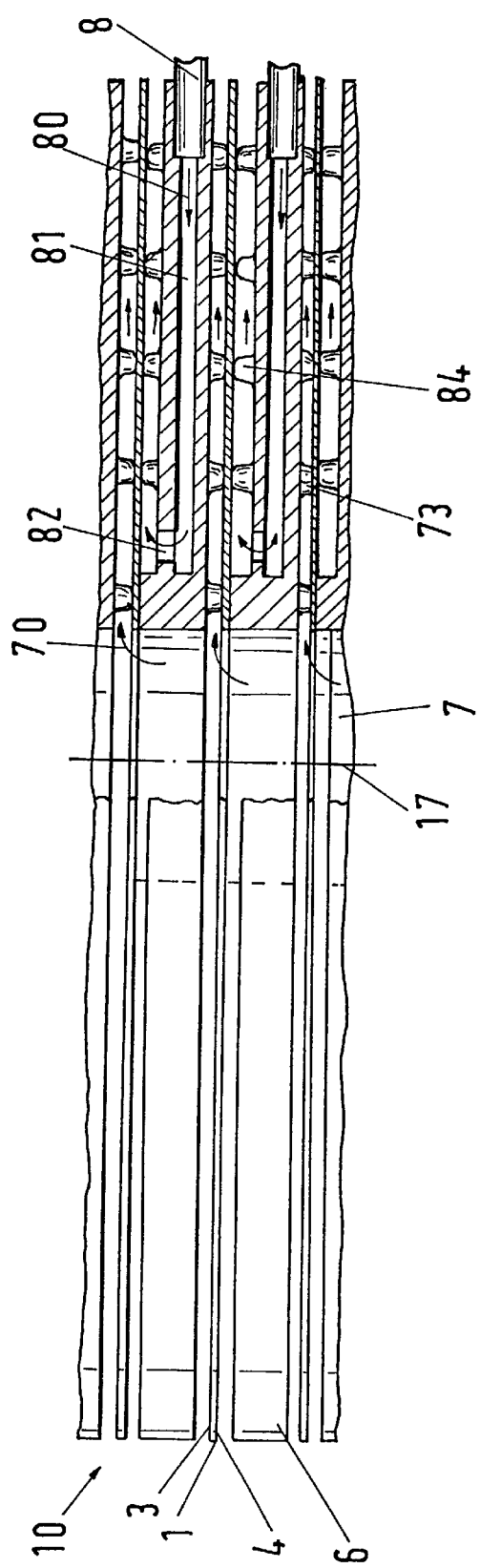

The invention relates to an electrochemically active element for high temperature fuel cell in accordance with the preamble of claim 1 and to a fuel cell battery.

High temperature fuel cells are known—see for example EP-A 0 714 147 (=P.6651)—in which the electrochemically active element, the so-called PEN, is formed as a self supporting plate, which is however very thin and extremely fragile. The PEN consists of a positive electrode (P), an electrolyte (E) and a negative electrode (N). The positive electrode or cathode is arranged at the air side, the negative electrode or anode at the gas side. The PEN is a separate element which can be built into the fuel cell battery. Because of its fragility the assembly of the battery is difficult.

The electrolyte, which conducts oxygen ions at the operating temperature of about 900° C., consists of stabilised zirconium oxide ($ZrO_2$) to which further substances have been added to improve the mobility of the oxygen ions, namely for example 3 to 12 $^{mol}/_o$ (mole percent) $Y_2O_3$. One can also add $A_2O_3$ (2 to 20$^{mol}/_o$) in order to obtain a greater strength of the electrolyte layer.

The electrodes are applied to the electrolyte layer by sintering on, first the anode at a sintering temperature of about 1250–1450° C., then the cathode at a lower sintering temperature (1100–1300° C.). Through the influence of the high temperature during the sintering of the anode material a grain growth takes place in the electrolyte layer, through which this layer becomes more brittle and more fragile. Special care must therefore be taken when the battery is assembled. Cracks can also form in the PEN during operation, in particular if the temperature is lowered and then raised again in repeated interruptions of the operation.

The object of the invention is to provide an electrochemically active element for a high temperature fuel cell which is less fragile than the known PENs. this object is satisfied by the element characterised in claim 1.

The electrochemically active element (1) for a high temperature fuel cell is designed in layers and comprises an anode layer, a cathode layer and an electrolyte layer which is arranged therebetween. The electrolyte is a ceramic material of zirconium oxide $ZrO_2$ stabilised with yttrium Y which can also contain aluminium oxide $Al_2O_3$ in addition. The anode is manufactured from a power mixture through sintering on the electrolyte layer. This anode mixture contains the oxides NiO and $CeO_2$ and can contain an oxide of the type $A_2O_3$, with for example A=Sm, Y, Gd and/or Pr. In accordance with the invention 0.5–5 $^{mol}/_o$ CoO, FeO and/or MnO is or are to be added to the anode mixture in order to lower the sintering temperature of the mixture.

Thanks to the lowering of the sintering temperature in the manufacture of the anode as a result of the measure in accordance with the invention, the crystal growth in the electrolyte is less strongly pronounced so that the original strength of the electrolyte layer is largely retained.

The dependent claims 2 to 10 relate to advantageous embodiments of the element in accordance with the invention. The subject of claim 11 is a fuel cell battery with elements in accordance with the invention.

The invention will be explained in the following with reference to the drawings. Shown are:

FIG. 1 a section of a fuel cell battery in accordance with the invention and

Figure 2:
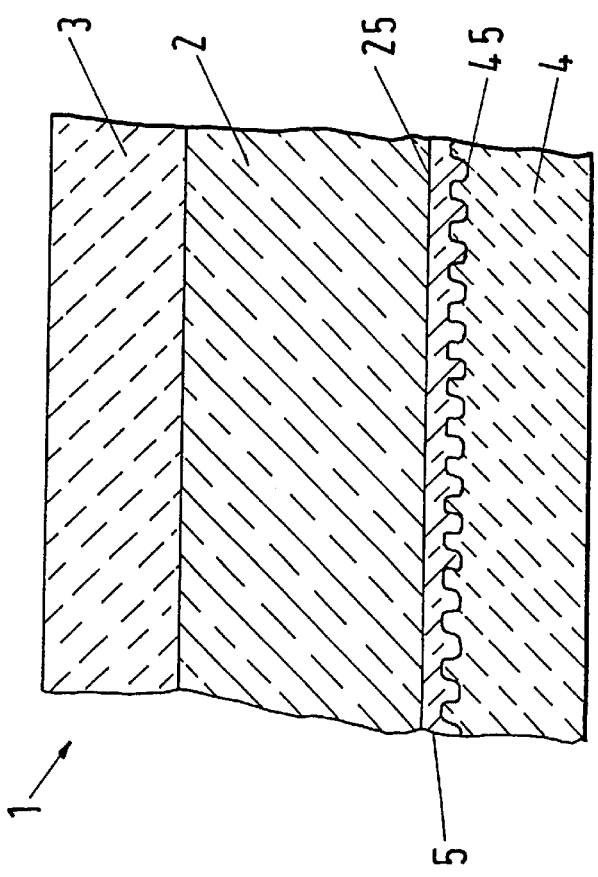

FIG. 2 a schematic illustration of a cross-section through an electrochemically active element in accordance with the invention.

The fuel cell battery 10 which is illustrated in FIG. 1—left in a side view, right in a cross-section—comprises a plurality of PENs 1 together with planar gas and air supply elements 6. The battery 10 is designed substantially centrally symmetrically with an axis 17 in the centre. The separable elements 1 and 6 are arranged stack-like in alternating order and are in electrical contact with one another, with a large number of contact locations being distributed uniformly over the entire electrode region.

A gaseous fuel 70 is supplied to the anodes 3 via a central passage 7 which extends along the stack axis 17 and via the individual gas and air supply elements 6. Air 80 is fed in at the periphery of the stack (8) into gap-shaped chambers 81. After a preheating in these chambers 81 the air likewise enters via passage openings 82 centrally to the cathode 4, where it flows back to the periphery parallel to the gas 70. The sides of the gas and air supply elements 6 which face the electrodes 3 and 4 are provided with elevations 73 and 84 which form the electrical contact points on the electrodes. The gas and air supply elements 6 are made of a metallic material so that a current can flow in the direction of the axis of the stack 17 as a result of the voltages produced in the individual PENs.

The construction of a PEN of planar design is shown in FIG. 2: an anode 3, an electrolyte 2, a cathode 4 and an intermediate layer 5 which need not necessarily be present. A reduction of polarisation effects can be produced by this layer 5, which is arranged between the electrolyte layer 2 and the cathode layer 4, namely in that both an electronic and an ionic conduction are furthered. Furthermore, the long term stability of the PEN can also be improved with the intermediate layer since it counteracts the formation of unfavourable phases as a diffusion barrier during the sintering of the cathode 4.

The application of the powder mixture in the manufacture of the electrodes can be done by means of a silk screen printing technique. In this the particles of the powder are mixed with means for binding, wetting and dissolving to form a flowable mixture. It can be advantageous if, for example to influence the viscosity, still further substances such as e.g. waxes are added.

The thickness of the electrolyte layer 2 amounts to around 100–300 μm. The anode and cathode layer 3 and 4 respectively each have thicknesses of about 30 μm. A thickness with a mean value between about 1 and 5 μm is provided for the intermediate layer 5. This thickness varies strongly in the micron range so that the boundary surface 45 to the cathode layer 4 is substantially larger than the boundary surface 25 to the electrolyte layer 2.

The powder mixture of the anode 3 contains oxide Nio and CeO2 as well as an oxide of the type $A_2O_3$, with for example A=Sm (samarium), Y (yttrium), Gd (gadolinium) and/or Pr (praseodymium). In addition 0.5–5 $^{mol}/_o$ CoO, FeO and/or MnO is or are to be added to this anode mixture in order to lower the sintering temperature of the mixture. This temperature can be lowered by at least 100 K with the named substances.

In the anode mixture the components NiO can partially be substituted by $RuO_2$, with the proportion of these components advantageously amounting to about 60–80 $^{wt}/_o$ (percent by weight). This substance is then provided if a reforming of methane is to be carried out by the anode 3 (conversion of $CH_4$ into CO and $H_2$ in the absence of $H_2O$ in the fuel gas).

The oxide of the type $A_2O_3$ is contained in the anode mixture at about 10 to 20 $^{mol}/_o$, whereas the remainder consists, in addition to NiO and where appropriate $RuO_2$, of $CeO_2$ and CoO, FeO and/or MnO.

The substance mixture of the cathode 4 has the following composition: $(Ln_{1-w}E_w)(G_{1-z}J_z)O_3$, with Ln being a lanthanide, for example Y, La or Pr, preferably Pr, E being an alkaline earth metal, for example Mg, Ca or Sr, preferably Sr, G being a transition metal, for example Cr, Mn, Fe, Co or Ni, preferably Mn, and J being a second transition metal not identical to G, preferably Co, and furthermore with w being greater than 0.1 and less than 0.5, preferably 0.4, and z being greater than 0.01 and less than 0.5, preferably 0.02.

The cathode mixture can be substituted in the amount of 10–30 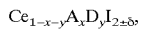 by partially or fully stabilised $ZrO_2$. The metals contained in the cathode mixture, for example Pr, Sr, Mn and Co, can be introduced into the powder mixture as salts of organic substances, in particular of acetate. A conversion of the metals into metal oxides with a simultaneous elimination of the organic matter is provided when the fuel cell is put into operation, namely in the heating up to the operating temperature and under the action of atmospheric oxygen. Salts of noble metals, in particular palladium acetate, can also be added to the cathode mixture as means for the catalytic acceleration of the cathode reaction.

The intermediate layer consists to the greatest extent of a ceramic material which, on the one hand, contains CeO and, on the other hand, contains an oxide of the type $A_2O_3$—as is already the case with the anode mixture. The same substances are added to this material to lower the sintering temperature as to the anode mixture, namely CoO, FeO and/or MnO, so that a composition with the following formula is present:

$$Ce_{1-x-y}A_xD_yI_{2\pm\delta},$$

with

A being one of the elements Y, Pr, Sm, and/or Gd,

D being one of the elements Fe, Co, and/or Mn and furthermore with x being greater than 0.1 and less than 0.4, y being greater than 0.005 and less than 0.05 and δ being a small number on the order of magnitude of 0.1.

A PEN with one of the above specified compositions can also be curved instead of planar, for example tubular.

What is claimed is:

1. An electrochemically active element for a high temperature fuel cell which is designed in layers and comprises an anode layer, a cathode layer and an electrolyte layer which is arranged therebetween, with the electrolyte being a ceramic material of zirconium oxide $ZrO_2$ stabilized with yttrium Y, the anode being manufactured from a powder mixture through sintering on the electrolyte layer, and the anode mixture containing oxides NiO and $CeO_2$ and containing $A_2O_3$, wherein A is a member selected from the group consisting of Sm, Y, Gd, Pr, and mixtures thereof, wherein the NiO component of the anode mixture amounts to about 60–80 weight percent, characterized in that 0.5–5 mole percent of a member selected from the group consisting of CoO, FeO, MnO and mixtures thereof is added to the anode mixture in order to lower the sintering temperature of the mixture.

2. The element in accordance with claim 1 characterized in that $A_2O_3$ is contained in the anode mixture with at most 20 mole percent whereas the remainder consists of $CeO_2$ and CoO, FeO and/or MnO in addition to NiO.

3. The element in accordance with claim 1 characterized in that the cathode is manufactured from a powder mixture through sintering; and in that this cathode mixture has the following composition:

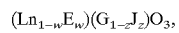
$$(Ln_{1-w}E_w)(G_{1-z}J_z)O_3,$$

with

Ln being a lanthanide, said lanthanide is a member selected from the group consisting of Y, La and Pr, E being an alkaline earth metal, said alkaline earth metal is a member selected from the group consisting of Mg, Ca and Sr, G being a transition metal, said transition metal is a member selected from the group consisting of Cr, Mn, Fe, Co and Ni, and J being a second transition metal not identical to G, and furthermore with w being greater than 0.1 and less than 0.5, preferably 0.4, and z being greater than 0.01 and less than 0.5, preferably 0.02.

4. The element in accordance with claim 3 characterized in that 10–30 mole percent of the cathode mixture is substituted by partially or fully stabilized $ZrO_2$.

5. The element in accordance with claim 3 characterized in that the metals contained in the cathode mixture, wherein said metal is a member selected from the group consisting of Pr, Sr, Mn and Co, are introduced into the powder mixture as salts of organic substances; and in that a conversion of the metals into metal oxides under the action of atmospheric oxygen with a simultaneous elimination of the organic matter is provided when the fuel cell is put into operation.

6. The element in accordance with claim 3 characterized in that an intermediate layer through which a reduction of the polarization effects can be produced is arranged between the electrolyte layer and the cathode layer.

7. The element in accordance with claim 6 characterized in that the intermediate layer consists of a ceramic material which contains CeO and $A_2O_3$ to which material the same substances are added as to the anode mixture for lowering the sintering temperature, namely CoO, FeO and/or MnO, so that a composition with the following formula is present:

$$Ce_{1-x-y}A_xD_yO_{2\pm\delta},$$

with

A being one of the elements selected from the group consisting of Y, Pr, Sm,

Gd and mixtures thereof;

D being one of the elements Fe, Co, and/or Mn and furthermore with x being greater than 0.1 and less than 0.4, y being greater than 0.005 and less than 0.05 and δ being a small number of about 0.1.

8. The element in accordance with claim 7 characterized in that the intermediate layer has a thickness with an average value between about 1 and 5 μ; and wherein the boundary surface of the cathode layer is substantially larger than the boundary surface of the electrolyte layer.

9. The element in accordance with claim 1 characterized in that it is designed to be planar; in that the thickness of the electrolyte layer is about 100–300 μm; and in that the anode and cathode layers each have thicknesses of about 30 μm.

10. Fuel cell battery with electrochemically active elements in accordance with claim 9 characterized in that the named elements are arranged together with planar gas and air supply elements in the form of a stack, with the individual elements being separably in contact with one another.

11. The element in accordance with claim 1 characterized in that the electrolyte being a ceramic material of zirconium oxide $ZrO_2$ stabilized with yttrium Y and further containing aluminum oxide $Al_2O_3$.

12. The element in accordance with claim 2 characterized in that the anode mixture further comprises $RuO_2$.

13. An electrochemically active element for a high temperature fuel cell which is designed in layers and comprises an anode layer, a cathode layer and an electrolyte layer which is arranged therebetween, with the electrolyte being a ceramic material of zirconium oxide $ZrO_2$ stabilized with yttrium Y, the anode being manufactured from a powder mixture through sintering on the electrolyte layer, and the anode mixture containing oxides NiO, $RuO_2$ and $CeO_2$ and containing $A_2O_3$, wherein A is a member selected from the group consisting of Sm, Y, Gd, Pr, and mixtures thereof, wherein taken together, NiO and $RuO_2$ amount to about 60–80 weight percent, characterized in that 0.5–5 mole percent of a member selected from the group consisting of CoO, FeO, MnO and mixtures thereof is added to the anode mixture in order to lower the sintering temperature of the mixture.

* * * * *